United States Patent
Härtel et al.

(10) Patent No.: US 6,398,275 B1
(45) Date of Patent: Jun. 4, 2002

(54) BUMPER ARRANGEMENT

(75) Inventors: Wulf Härtel, Altenbeken; Hendrik Korinth, Paderborn, both of (DE)

(73) Assignee: Benteler Automobiltechnik GmbH & Co. KG, Paderborn (DE)

( * ) Notice: Subject to any disclaimer, the term of this patent is extended or adjusted under 35 U.S.C. 154(b) by 0 days.

(21) Appl. No.: 09/770,363

(22) Filed: Jan. 25, 2001

(30) Foreign Application Priority Data

Oct. 19, 2000  (EP) .............................................. 00122777

(51) Int. Cl.⁷ ............................................... B60R 19/02
(52) U.S. Cl. ........................ 293/102; 293/120; 293/121
(58) Field of Search ................................. 293/102, 123, 293/132, 133, 146, 147, 148, 120, 121

(56) References Cited

U.S. PATENT DOCUMENTS

| | | | | |
|---|---|---|---|---|
| 607,901 A | * | 7/1898 | Woodwort | 293/120 X |
| 1,348,030 A | * | 7/1920 | Millard | 293/120 |
| 4,116,480 A | * | 9/1978 | Crestetto | 293/102 |
| 4,542,925 A | * | 9/1985 | Huber et al. | 293/120 |
| 5,154,462 A | | 10/1992 | Carpenter | |
| 5,314,229 A | * | 5/1994 | Matuzawa et al. | 293/133 X |
| 5,507,540 A | * | 4/1996 | Pernot | 293/102 |
| 5,603,541 A | * | 2/1997 | Wada et al. | 293/102 |
| 6,082,792 A | * | 7/2000 | Evans et al. | 293/133 |
| 6,161,867 A | * | 12/2000 | Tamura | 293/102 X |

FOREIGN PATENT DOCUMENTS

| DE | 2941879 | 4/1980 |
|---|---|---|
| DE | 4413641 | 6/1995 |
| DE | 196 43 049 A1 | 4/1998 |

* cited by examiner

Primary Examiner—Joseph D. Pape
Assistant Examiner—Lori L Coletta
(74) Attorney, Agent, or Firm—Friedrich Kueffner

(57) ABSTRACT

A bumper arrangement for a vehicle has a transverse support to be connected transversely to longitudinal supports of a frame of a vehicle. The transverse support has a shell member of a U-shaped cross-section with a stay and two legs connected to opposite sides of the stay. The legs have a grate structure comprised of several adjacently positioned and spaced apart ribs defining adjacently positioned openings.

8 Claims, 2 Drawing Sheets

BUMPER ARRANGEMENT

BACKGROUND OF THE INVENTION

1. Field of the Invention

The invention relates to a bumper arrangement for the front or rear of a car body of a motor vehicle that is shrouded by a skin panel.

2. Description of the Related Art

Different types of bumpers and bumper arrangements are known. For example, in German patent document 44 13 641 C1 a bumper is disclosed which has a transverse support designed as an energy absorbing member to be attached to the car body. At the front side of the transverse support impact members are arranged which are supported on the transverse support and are comprised of an energy-absorbing material which is preferably a plastic foam or a honeycomb structure of plastic material.

U.S. Pat. No. 5,154,462 discloses a bumper having a transverse support comprised of a C-shaped rear member, made of a first material, for example, steel, and fixedly connected to the longitudinal supports, and a C-shaped closure member covering the rear member and comprised of a second lighter material, for example, aluminum or fiberglass. Both members are joined such that they form a box-shaped hollow profiled member which is filled with an energy-absorbing material such as polypropylene or urethane foam.

In the German patent document 29 41 879 A1 a bumper configuration for a motor vehicle is disclosed which has a transverse support with a plurality of cutouts which are provided along its length at the front side of the transverse support. The cutouts are provided for receiving impact absorption members of urethane foam or polyethylene honeycombs.

In addition to the partially complicated and manufacturing-technologically complex configuration, all of the aforementioned embodiments have the disadvantage that they propose energy-absorbing members of plastic material, usually foamed foam bodies. Already the manufacture of these foam bodies may cause the release of environmentally hazardous materials. In particular, however, these members are disadvantageous in regard to recycling of motor vehicles. The employed plastic materials are often recyclable only with difficulties. Moreover, a separation of the metallic materials and the plastic materials is required for a proper recycling.

The German patent document 196 43 049 A1 discloses a bumper arrangement for the front or rear area of the car body of a motor vehicle. The bumper arrangement comprises a transverse support which is mounted by means of crash boxes on the longitudinal supports of the car body as well as a transverse beam which is provided under the transverse support and also supported on the longitudinal supports of the car body. However, this configuration is comparatively heavy and inflexible.

SUMMARY OF THE INVENTION

It is an object of the present invention to provide a bumper arrangement which in its basic concept avoids impact absorption members of plastic material and is improved with regard to its function, in particular, relating to the protection of pedestrians.

In accordance with the present invention, this is achieved in that the legs of the shell member comprise a grate structure of a plurality of adjacently arranged openings with ribs delimiting them.

Accordingly, the transverse support is comprised of a metallic shell member of a U-shaped cross-section with a stay and two legs, and the legs have a grate structure comprised of a plurality of adjacently arranged openings with ribs delimiting them.

Such a shell member is lightweight which is positive in the sense of weight reduction. However, its flexibility should be particularly stressed. During a crash at low force level at low speed, the transverse support will yield elastically. Upon surpassing a predetermined force level, the transverse support will deform plastically so that the energy resulting from the impact is converted into deformation work.

The inherent defined flexibility behavior of the transverse support contributes to achieving a greatest possible protection of pedestrians.

Expediently, the ribs extend in the longitudinal direction of the motor vehicle.

The flexibility behavior of the bumper arrangement can be realized in that the ribs are formed as rated buckling points. This can be achieved by a slightly angled or bent or buckled or curved extension of the ribs. Of course, the integration into the ribs of differently configured rated buckling points, which will yield flexibly in a defined manner upon surpassing a certain force level, is also conceivable.

In another advantageous embodiment, flanges adjoin the end of the legs of the shell member. These flanges contribute to a stiffening of the transverse support in the rearward area facing the longitudinal supports.

An especially advantageous further embodiment of the basic inventive principle is a bumper arrangement wherein the shell member is supported on an inner profiled member which is also transversely arranged relative to the longitudinal supports. The profiled member has preferably a U-shaped cross-section with laterally extending flanges adjoining its legs.

The flanges of the shell member can be supported on the flanges of the profiled member. Possible is, for example, a welded, riveted, screwed or adhesive connection of the shell member and the profiled member.

According to another preferred embodiment, the legs of the shell member and the legs of the profiled member extend from their respective stays, which are positioned at a spacing to one another, in a direction toward the longitudinal supports.

As a result of the stays of the shell member and the profiled member being spaced from one another, the transverse support has two planes with different force levels. In the case of an impact, first the outwardly positioned shell member is loaded and used for impact absorption and is elastically and/or plastically deformed in this connection. Once this absorption capacity has been used up or exhausted, the shell member and the profiled member jointly provide a resistance for an impact at a higher force level.

The energy absorption capacity of a bumper arrangement according to the invention can be further increased when the transverse support is connected by crash boxes and mounting plates to the longitudinal supports. The crash boxes are designed, in particular, to absorb energy resulting from an impact at higher force level by transforming the energy into deformation work. This can further reduce damage to parts of the supporting vehicle structure.

According to a further advantageous embodiment of the basic inventive principle, a transverse beam is provided under the transverse support.

By means of the transverse beam arranged under the transverse support, it is possible to provide for a front or rear crash an additional energy absorption in the area near the ground. In addition to the energy absorption, a further positive effect of this arrangement is that an obstacle is impacted with a larger surface area. This results in a change or alleviation of the impact. Moreover, the energy absorption is divided onto a further force level. This is advantageous, in particular, with respect to the protection of pedestrians.

Expediently, the transverse beam is supported by spacer stays (crash stays) and mounting plates on the longitudinal supports of the motor vehicle.

In certain applications, it is conceivable in the context of the invention to provide impact-absorbing damping members between the inwardly positioned profiled member and the outer shell member. Even though with the bumper arrangement according to the invention the elimination of plastic foam bodies is desired, this feature is not to be completely excluded. Such a bumper arrangement realizes a weight reduction and can provide an additional impact absorption capacity for use in connection with heavy motor vehicles.

DESCRIPTION OF THE PREFERRED EMBODIMENTS

Figure 1:
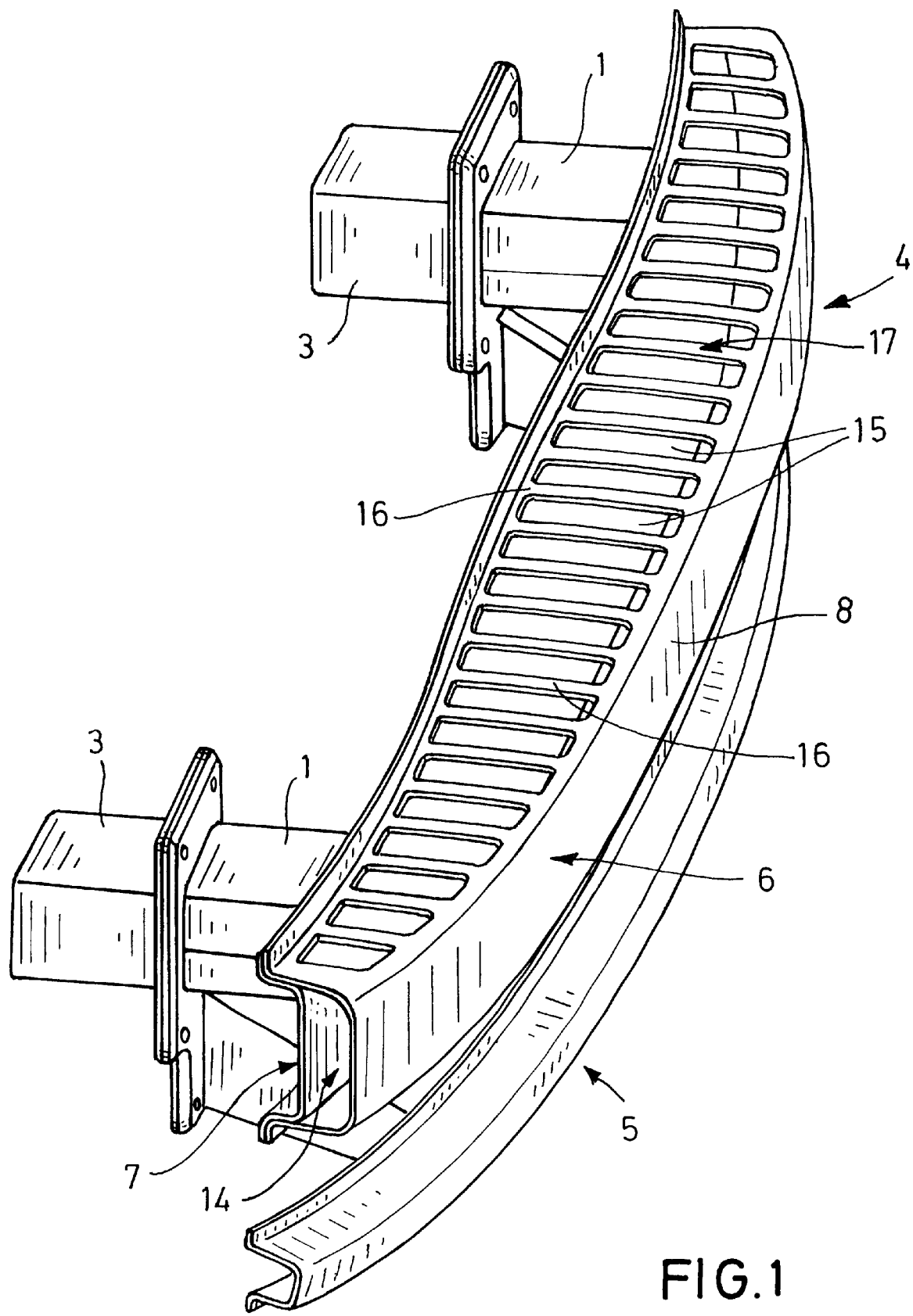
FIG. 1 is a perspective view of a bumper arrangement according to the invention.
Figure 2:
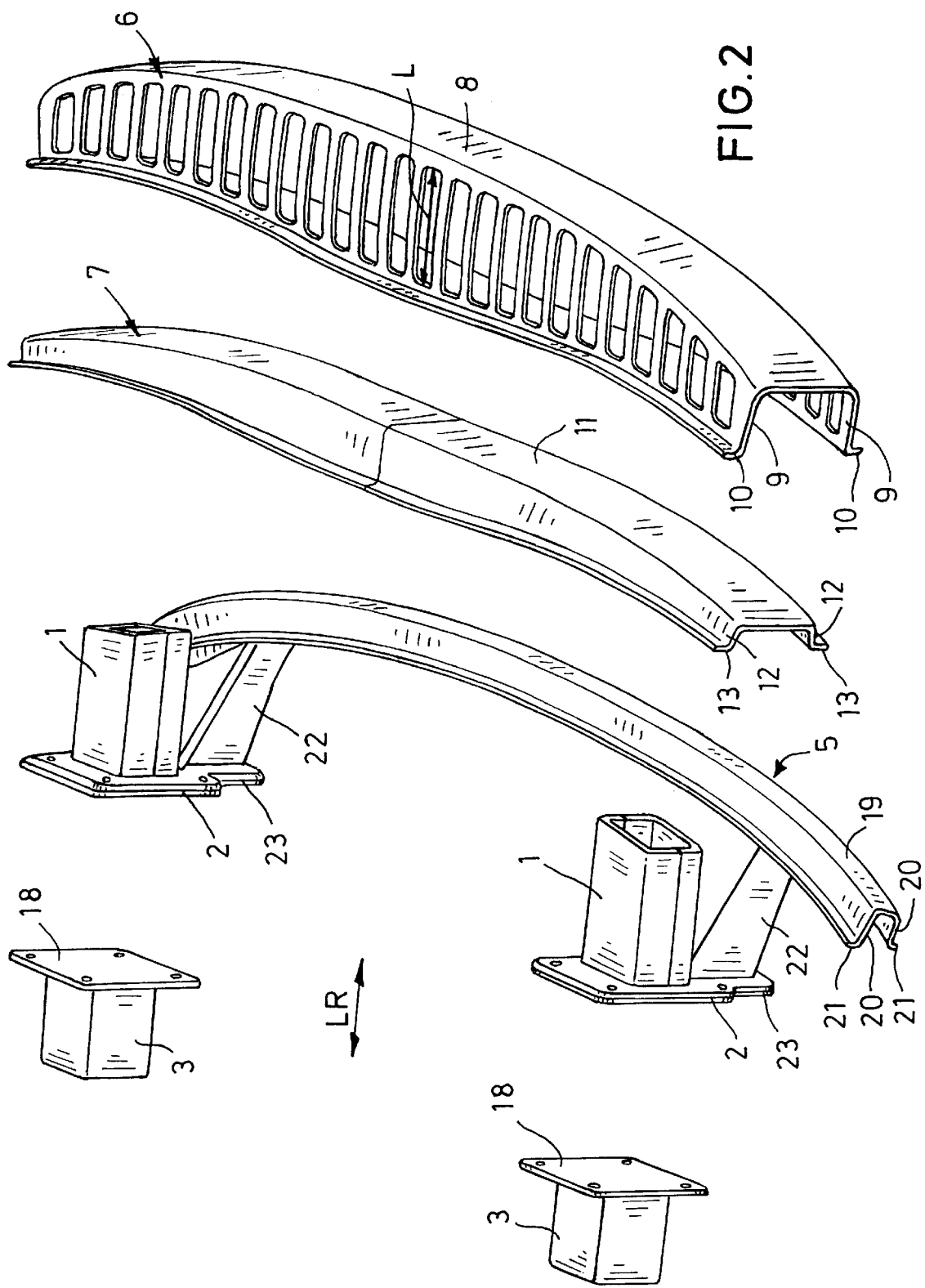
FIG. 2 shows the essential components of the bumper arrangement according to the invention in an exploded view.

In FIGS. 1 and 2 a bumper arrangement is illustrated for a front or rear area covered with a shroud or skin panel (not shown) of a car body of a passenger car (not illustrated).

The bumper arrangement comprises a transverse support 4 connected at its ends by means of crash boxes 1, comprised of rectangular hollow profiled members, and mounting plates 2 to the longitudinal supports 3 of the vehicle frame. A transverse beam 5 is provided under the transverse support 4.

The transverse support 4 is comprised of a shell member 6 of a U-shaped cross-section and a profiled member 7 having also a U-shaped cross-section. The shell member 6 has a stay 8 with two legs 9 and flanges 10 connected to the legs 8 and extending outwardly in the shown embodiment. The profiled member 7 also comprises a central stay 11 with lateral legs 12 and flanges 13 projecting therefrom.

The shell member 6 is supported with its flanges 10 on the flanges 13 of the profiled member 7 and is connected with the profiled member 7, for example, by welding or by an adhesive connection.

Beginning at the stays 8 or 11, the legs 9 of the shell member 6 and the legs 12 of the profiled member 7 are oriented toward the longitudinal supports 3. One can also see that the stays 8, 11 of the shell member 6 and the profiled member 7 are positioned at a spacing relative to one another. A hollow space 14 is thus formed within the transverse support 4 between the shell member 6 and the profiled member 7.

The legs 9 of the shell member 6 have a grate structure comprised of several openings 15 arranged adjacent to one another and delimited by ribs 16. The ribs 16 extend in the longitudinal direction LR of the motor vehicle. The length L of the openings 15 decreases from the center of the shell member 6 toward its ends. The stay 8 of the shell member 6 is closed, i.e., has no openings.

The grate structure of the shell member 6 provides the transverse support 4 with a defined flexibility behavior. When an impact at low force level and low speeds occurs, an elastic flexible deformation with a spring effect occurs in the ribs 16 of the shell member 6. Upon surpassing a certain force level, the shell member 6 deforms plastically. The ribs 16 in this connection act as flexible elements by which the deformation is initiated. It is furthermore possible to provide the ribs 16 with rated buckling points which, for example, can be realized by a slightly bent or curved shaping of the ribs 16. Such a rated buckling point is indicated in FIG. 1 in an exemplary fashion with reference numeral 17.

The crash boxes 1 are welded with one end to the transverse support 4 and with the other end to the mounting plates 2. The mounting plates 2 are detachably connected to mounting plates 18 which are welded to the end faces of the longitudinal supports 3.

The transverse beam 5 under the transverse support 4 is formed of a U-shaped profiled section with stay 19, legs 20, and flanges 21 and is connected by slantedly extending spacers stays 22 to the lower tongues 23 of the mounting plates 2. The spacer stays 22 can be comprised of hollow profiled sections which with regard to their cross-section are matched to the component requirements and the configuration but can also be U-shaped or hat-shaped profiled sections.

The forces which occur upon impact are distributed by the transverse beam 5 over the surface area. This can reduce shearing forces exerted onto the lower extremities of a pedestrian.

While specific embodiments of the invention have been shown and described in detail to illustrate the inventive principles, it will be understood that the invention may be embodied otherwise without departing from such principles.

What is claimed is:

1. A bumper arrangement for a vehicle, the bumper arrangement comprising:

a transverse support configured to be connected transversely to longitudinal supports of a frame of the vehicle;

the transverse support comprising a shell member of a U-shaped cross-section with a stay and two legs connected to opposite sides of the stay;

wherein the legs have a grate structure comprised of several adjacently positioned and spaced apart ribs defining adjacently positioned openings;

wherein the transverse support further comprises a profiled member configured to extend transversely to the longitudinal supports of the frame of the vehicle; and wherein the profiled member has a U-shaped cross-section with a stay and two legs connected to opposite sides of the stay, wherein the legs of the profiled member rest against the legs of the shell member and the stay of the profiled member is spaced from the stay of the shell member, wherein the two legs of the profiled member project from the stay of the profiled member toward the longitudinal supports, and wherein the two legs of the shell member project from the stay of the shell member toward the longitudinal supports.

2. The bumper arrangement according to claim 1, wherein the ribs extend in a longitudinal direction of the vehicle.

3. The bumper arrangement according to claim 1, wherein the ribs form rated buckling points.

4. The bumper arrangement according to claim 1, wherein the shell member further comprises flanges connected to ends of the two legs opposite the stay.

5. The bumper arrangement according to claim 1, further comprising crash boxes with mounting plates, wherein the transverse support is connected to the crash boxes opposite the mounting plates, and wherein the mounting plates are configured to be connected to the longitudinal supports.

6. The bumper arrangement according to claim 1, further comprising a transverse beam arranged under the transverse support.

7. The bumper arrangement according to claim 6, further comprising spacer stays with mounting plates, wherein the transverse beam is connected to the spacer stays opposite the mounting plates, and wherein the mounting plates are configured to be supported on the longitudinal supports.

8. The bumper arrangement according to claim 1, wherein the shell member comprises flanges connected to ends of the two legs thereof and the profiled member comprises flanges connected to ends of the two legs thereof, and wherein the flanges of the shell member are attached to the flanges of the profiled member.

* * * * *